(12) United States Patent
McMahon et al.

(10) Patent No.: US 7,833,033 B2
(45) Date of Patent: Nov. 16, 2010

(54) SOLAR PANEL JUNCTION BOX AND COMPONENTS THEREOF

(75) Inventors: Sean McMahon, Ennis (IE); Peter Commane, Shannon (IE); Colm Reidy, Sixmilebridge (IE); George Hesse, Newmarket on Fergus (IE); Mike Mahony, Fr. Russel Road (IE)

(73) Assignee: Molex Incorporated, Lisle, IL (US)

( * ) Notice: Subject to any disclaimer, the term of this patent is extended or adjusted under 35 U.S.C. 154(b) by 297 days.

(21) Appl. No.: 12/148,088

(22) Filed: Apr. 16, 2008

(65) Prior Publication Data

US 2009/0260676 A1    Oct. 22, 2009

(51) Int. Cl.
*H01R 4/60* (2006.01)

(52) U.S. Cl. .................. 439/212; 439/213; 439/721; 439/860; 439/888; 439/907

(58) Field of Classification Search ................. 439/212, 439/213, 721, 860, 888, 907
See application file for complete search history.

(56) References Cited

U.S. PATENT DOCUMENTS

| | | | | |
|---|---|---|---|---|
| 2,408,843 A | * | 10/1946 | Gauthier | 439/888 |
| 2,762,030 A | * | 9/1956 | Scoville | 439/883 |
| 3,657,683 A | * | 4/1972 | Grieshaber | 439/781 |
| 4,157,207 A | * | 6/1979 | Robinson | 439/82 |
| 4,423,920 A | * | 1/1984 | Cooper et al. | 439/62 |
| 5,314,350 A | * | 5/1994 | Matthews et al. | 439/404 |
| 5,554,040 A | * | 9/1996 | Sugiura et al. | 439/212 |
| 6,461,172 B2 | * | 10/2002 | Ross | 439/78 |
| 6,494,723 B2 | * | 12/2002 | Yamane et al. | 439/76.2 |

\* cited by examiner

*Primary Examiner*—Tho D Ta
(74) *Attorney, Agent, or Firm*—Larry I. Golden (57) ABSTRACT

A solar panel junction box and components thereof including a plurality of generally L-shaped connecting elements, each comprising a conductive member with a flat section and a first angular section. The first angular section having a resilient cut-out connecting member forming an electrical contact and the flat section having one or more retaining slots for receiving an electronic component terminal. The junction box further includes a plate having rectangular extensions for retaining and positioning solar ribbon and cylindrical extensions for positioning the plate with respect to a base which has cylindrical receptacles for receiving the cylindrical extensions and also has a channel section for edgewise accommodation of the connecting element and compartment areas which position the diodes adjacent the respective retaining slots.

27 Claims, 8 Drawing Sheets

SOLAR PANEL JUNCTION BOX AND COMPONENTS THEREOF

FIELD OF THE INVENTION

The present invention is in the field of solar technology and, more particularly, to a solar panel junction box and its various components.

DESCRIPTION OF RELATED ART

Solar cells are frequently used for converting solar light into output voltages which are, generally, too low to directly operate electrical devices. Therefore, several solar cells are interconnected into solar cell panels or modules. Usually, a serial or a parallel connection of the solar cells in the solar cell panel may be provided, wherein the individual currents or voltages of the solar cells are cumulated to obtain an overall current or voltage. A solar module comprises a substrate on or within which a plurality of solar cells are arranged and electrically interconnected. When assembling a solar cell module having multiple solar cells it is desirable to provide for an effective and efficient connection to each of the solar cells.

Different solar cell arrangements are described, for example, in U.S. Pat. Nos. 6,582,249; 7,097,516 and 7,134,883, as well as in US patent application publications 2005/0161080 and 2006/0000504. In particular, the 2006/0000504 publication discloses a solar module having a connecting element wherein a spring contact is biased against a contact surface opposing the light sensitive surface of solar elements. The US 2005/0161080 publication discloses an electrical junction and joint box for a solar cell module having a connection device receiving thin conductor strips routed out of the solar cell module from underneath when the junction and joint box is seated on the solar cell module.

SUMMARY OF THE INVENTION

Before the invention is described in detail, it is to be understood that this invention is not limited to the particular component parts of the devices described or process steps of the methods described as such devices and methods may vary. It is also to be understood that the terminology used herein is for purposes of describing particular embodiments only, and is not intended to be limiting. It must be noted that, as used in the specification and the appended claims, the singular forms "a," "an" and "the" include singular and/or plural referents unless the context clearly dictates otherwise.

It is an object of the invention to provide an efficient contacting concept for solar cells or solar cell modules.

This object is achieved by the features of the independent claims.

The invention is based on the finding that an efficient connecting concept may be achieved when providing edgewise retained, multiple generally L-shaped multifunctional connecting elements or terminals including electronic component-retaining slots on one leg for a direct diode connection to the input and output signals and a cut-out resilient tab on an other leg for contacting with a respective solar ribbon. Furthermore, a plate assembly may be provided which includes one or multiple extensions, in particular cylindrical and rectangular extensions. Cylindrical extensions may be received within hollowed cylindrical receptacles formed on a base wherein rectangular extensions position the ribbons from the solar panel in a manner that allows a quick and direct connection of the ribbon to the L-shaped terminal.

Hence, an aspect of the invention relates to a connecting element having a conductive member with a flat section and a first angular section, the flat section comprising at least one notch for receiving an electrical terminal and the first angular section comprising a resilient connecting member forming an electrical contact.

According to an embodiment, the flat section being arranged between the first angular section and a second angular section, wherein the second angular section forms a contact portion for cable connection thereto.

According to an embodiment, the first angular section comprises a recess towards which the resilient connecting member is resiliently movable, the resilient connecting member being, e.g., integrally formed with the first angular section.

According to an embodiment, a pair of connecting elements are provided for receiving opposite connecting terminals of an electric component arranged between the pair of connecting elements.

A further aspect of the invention relates to a connecting element having a conductive member with a flat section, a first angular section and a second angular section, the flat section being arranged between the first angular section and the second angular section, the first angular section comprising a resilient connecting member forming an electrical contact and the second angular section forming a proper contact portion for cable connection thereto.

According to an embodiment, the flat section comprises at least one notch for electrical connection of an electric component, such as a diode.

According to a refinement, a pair of connecting elements are provided for receiving opposite connecting terminals of the electric component arranged between the pair of connecting elements.

According to an embodiment, the first angular section is coplanar with the flat section, with the resilient connecting member extending outward therefrom, and with the second angular section extending orthogonal to the flat section within an orthogonality range.

The orthogonality range according to the invention relates, e.g., to a range between 85°, 90° and 95°.

According to an embodiment, the flat section extends in a direction of a first axis, the first angular section extends in a direction of a second axis, the second angular section extends in a direction of a third axis, the first axis, the second axis and the third axis being orthogonal with respect to each other within an orthogonality range.

According to an embodiment, the first angular section comprises a recess towards which the resilient connecting member is resiliently movable, the resilient connecting member being, e.g., integrally formed with the first angular section.

According to a further aspect, the invention relates to a junction box comprising a connecting element having a conductive member with a flat section having at least one notch and a first angular section, the first angular section comprising a resilient connecting member forming an electrical contact, a base member for accommodating said connecting element and an electric component having a connecting terminal, the notch of the flat section being formed to receive the connecting terminal of the electric component.

According to an embodiment, the base member comprises a channel section for edgewise accommodation of the conductive member.

According to an embodiment, the conductive member enables an external cable connection thereto.

According to an embodiment, the conductive member has a second angular section forming a contact portion for cable connection thereto, the flat section being arranged between the first angular section and the second angular section.

According to an embodiment, the junction box further comprises an electric component, in particular a capacitor or a diode.

According to an embodiment, the junction box comprises a plurality of connecting elements, each having a conductive member with a flat section having at least one notch and a first angular section, the first angular section comprising a resilient connecting member forming an electrical contact, the base member being adapted to accommodate a plurality of electric components, each having a connecting terminal, each notch being formed to accommodate a respective connecting terminal of an electric component.

According to a refinement, the junction box comprises a plurality of connecting elements, each having a conductive member with a flat section having at least one notch and a first angular section, at least some of the conductive members having a second angular section with the flat section being arranged between the first angular section and the second angular section.

An aspect of the invention relates to a junction box having a plate member with a first surface and a second surface, the second surface opposing the first surface, and a first protruding section protruding from the second surface for positioning a solar ribbon for connection with a resilient connecting member.

According to an embodiment, the first protruding section has a generally rectangular shape having two opposed surfaces respectively facing towards a longitudinal axis of the solar ribbon adhered thereto.

According to an embodiment, the first protruding section has a flat rectangular shape.

According to an embodiment, the plate member further comprises a second protruding section protruding from the second surface of said plate member.

According to an embodiment, the second protruding section being a cylindrical or tubular section protruding from the plate member.

According to an embodiment, the plate member having a plurality of first protruding sections protruding from the second surface for contacting to a plurality of solar ribbons and a plurality of second protruding sections which can be mated with a plurality of third protruding sections protruding from a base for associating the plate member with respect to the base for positioning the resilient connecting member against the solar ribbon.

According to an aspect, the invention relates to a solar panel junction box comprising a plate member having a first surface and a second surface opposing the first surface, the plate member having a first protruding section protruding from the second surface, a solar ribbon covering at least a part of a surface of the first protruding section to form a contact surface, a connecting element with a conductive member having a flat section and a first angular section, the first angular section comprising a resilient connecting member, the resilient connecting member resiliently contacting to the solar ribbon.

According to an embodiment, the second surface extends along a longitudinal axis of the plate member, the first protruding section perpendicularly protruding with respect to the longitudinal axis within an orthogonality range.

According to an embodiment, the first protruding section has a rectangular shape having two opposed surfaces.

According to an embodiment, the first protruding section has a flat rectangular shape.

According to an embodiment, the first protruding section has two opposing surfaces which are covered by the solar ribbon, the solar ribbon further extending on the second surface in a longitudinal direction of the plate member to the solar cell.

According to an embodiment, the conductive member having a second angular section, the flat section being arranged between the first angular section and the second angular section.

According to a refinement, a surface of the first angular section is coplanar with a surface of the flat section, with the resilient connecting member extending outward therefrom, the second angular section extending orthogonal to the flat section within an orthogonality range.

According to a refinement, the flat section extends in a direction of a first axis, the first angular section extends in a direction of a second axis, the second angular section extends in a direction of a third axis, the first axis, the second axis and the third axis being orthogonal with respect to each other within an orthogonality range.

According to an embodiment, the first angular section comprises a recess towards which the resilient connecting member is resiliently movable, the resilient connecting member being integrally formed with the first angular section.

According to an embodiment, the solar panel junction box further comprises a base member for accommodating an electric component, the notch of the flat section of the connecting element being formed to receive a connecting terminal of the electric component.

According to an embodiment, the solar panel junction box further comprises a base member for accommodating an electric component, the notch of the flat section of the connecting element being formed to receive a connecting terminal of the electric component, wherein the base member comprises a channel section for edgewise accommodation of the connecting element.

According to an embodiment, the solar panel junction box further comprises an electric component, in particular a capacitor or a diode.

According to an embodiment, the solar panel junction box further comprises a plurality of connecting elements, each comprising a conductive member with a flat section and a first angular section, each flat section having a notch, the first angular section comprising a resilient connecting member, a base member being formed to accommodate a plurality of electric components, each having a connecting terminal, each notch being formed to accommodate a connecting terminal of a respective electric component.

According to an embodiment, the solar panel junction box further comprises a base member, the base member comprising at least one third protruding section, wherein the plate member comprises at least one second protruding section protruding from the second surface of the plate member and wherein the at least one third protruding section accommodates the at least one second protruding section to assemble the base member to the plate member.

According to an aspect, the invention relates to a method for manufacturing a solar panel junction box. The method comprises forming a connecting element comprising a conductive member with a flat section comprising at least one notch and a first angular section, the first angular section comprising a resilient connecting member, forming a plate member having a first surface and a second surface, the second surface having a plurality of first protruding sections and a plurality of second protruding sections extending therefrom, adhering a solar ribbon against the plate member with at least a portion thereof covering a portion of the first protruding sections, forming a base member with a channel portion for retaining the conductive member in an edgewise orientation and with third protruding sections for respectively mating with the second protruding sections and for accommodating an electric component having a connecting terminal and arranging a connecting terminal of the electric component in the notch of the flat section of the connecting element with the resilient connecting member in contact with the solar ribbon covering the first protruding section.

According to an embodiment, the conductive member is formed with a second angular section, the flat section being arranged between the first angular section and the second angular section.

According to an aspect, the invention relates to a method for manufacturing a solar panel junction box. The method comprises forming a plate member having a first surface and a second surface, the second surface opposing the first surface, the plate member further comprising a first protruding section protruding from the second surface, adhering a solar ribbon covering at least a part of a surface of the first protruding section, forming a connecting element with a conductive member having a flat section, a first angular section and a second angular section, the first angular section comprising a resilient connecting member, and resiliently contacting the resilient connecting member to the first protruding section to connect to the solar ribbon.

Further manufacturing steps are directed to providing or forming further elements of the junction box for the solar panel.

DETAILED DESCRIPTION

Further embodiments of the invention will be described with respect to the following figures, in which.

Figure 1:
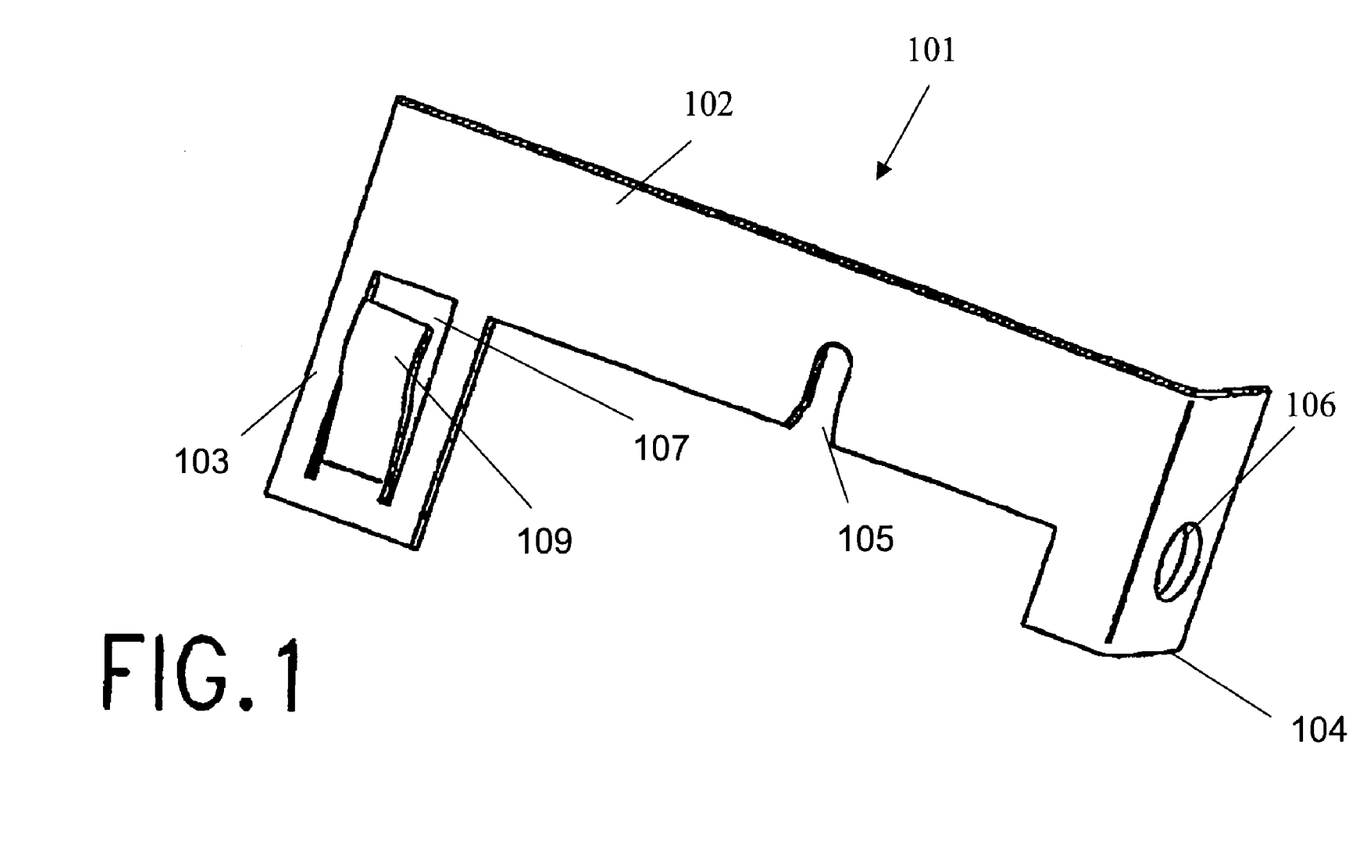
FIG. 1 discloses a connecting element.

The connecting element disclosed in FIG. 1 comprises a conductive member 101 with a flat section 102 and a first angular section 103 forming a generally L-shaped multifunctional connecting element. However, the conductive member 101 as depicted in FIG. 1 further comprises a second angular section 104 for reasons as described below. According to FIG. 1, the flat section 102 is arranged between the first angular section 103 and the second angular section 104. The flat section 102 further comprises a notch 105 forming an electronic component retaining slot for receiving a terminal of a diode for a direct diode connection. The first angular section 103 further comprises a recess 107 and a resilient connecting member 109, e.g., a cut-out resilient tab. The second angular section 104 preferably includes an opening or cut-out section 106, e.g., for easier cable connection, as described below.

Preferably, the connecting element is integrally formed. However, the connecting element may comprise a plurality of sub-elements.

Figure 4:
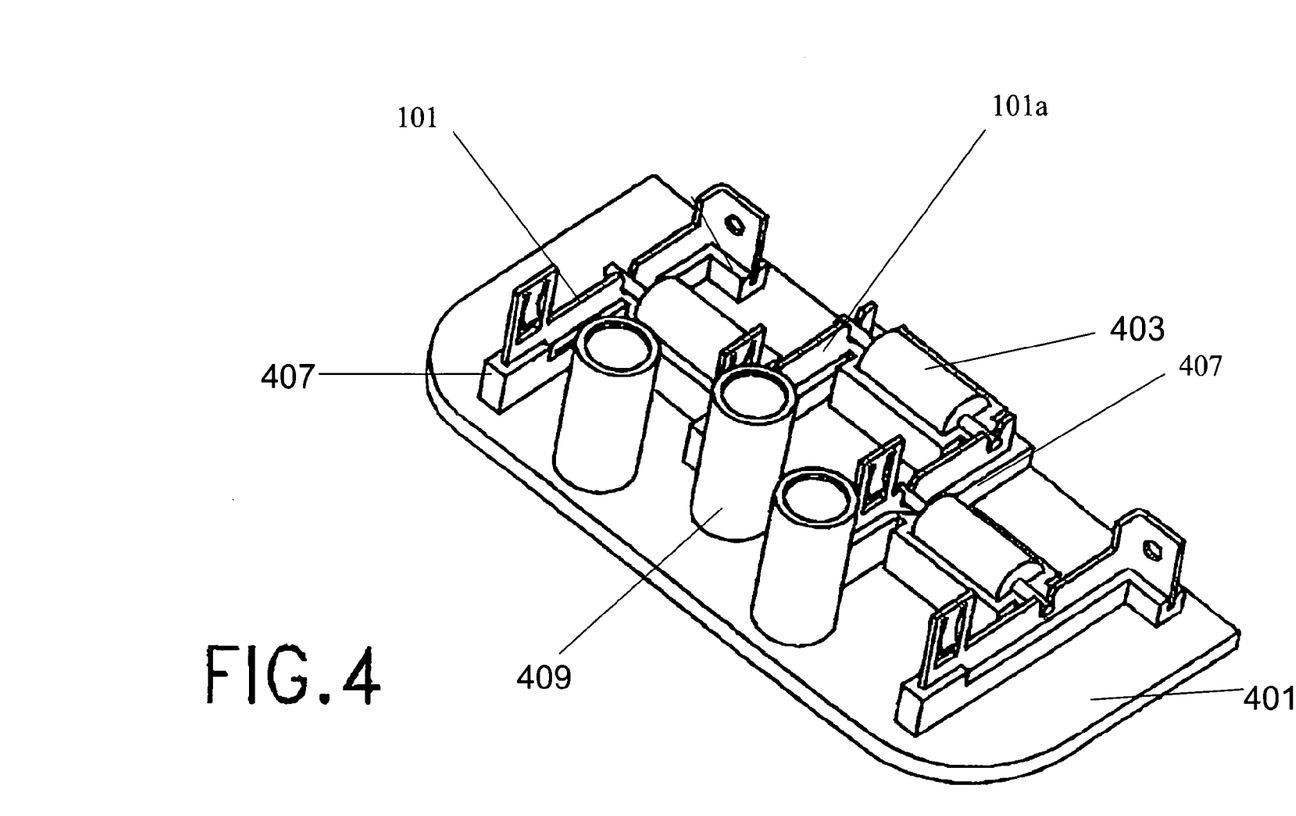
FIG. 4 discloses a base member and various components of a junction box.
Figure 5:
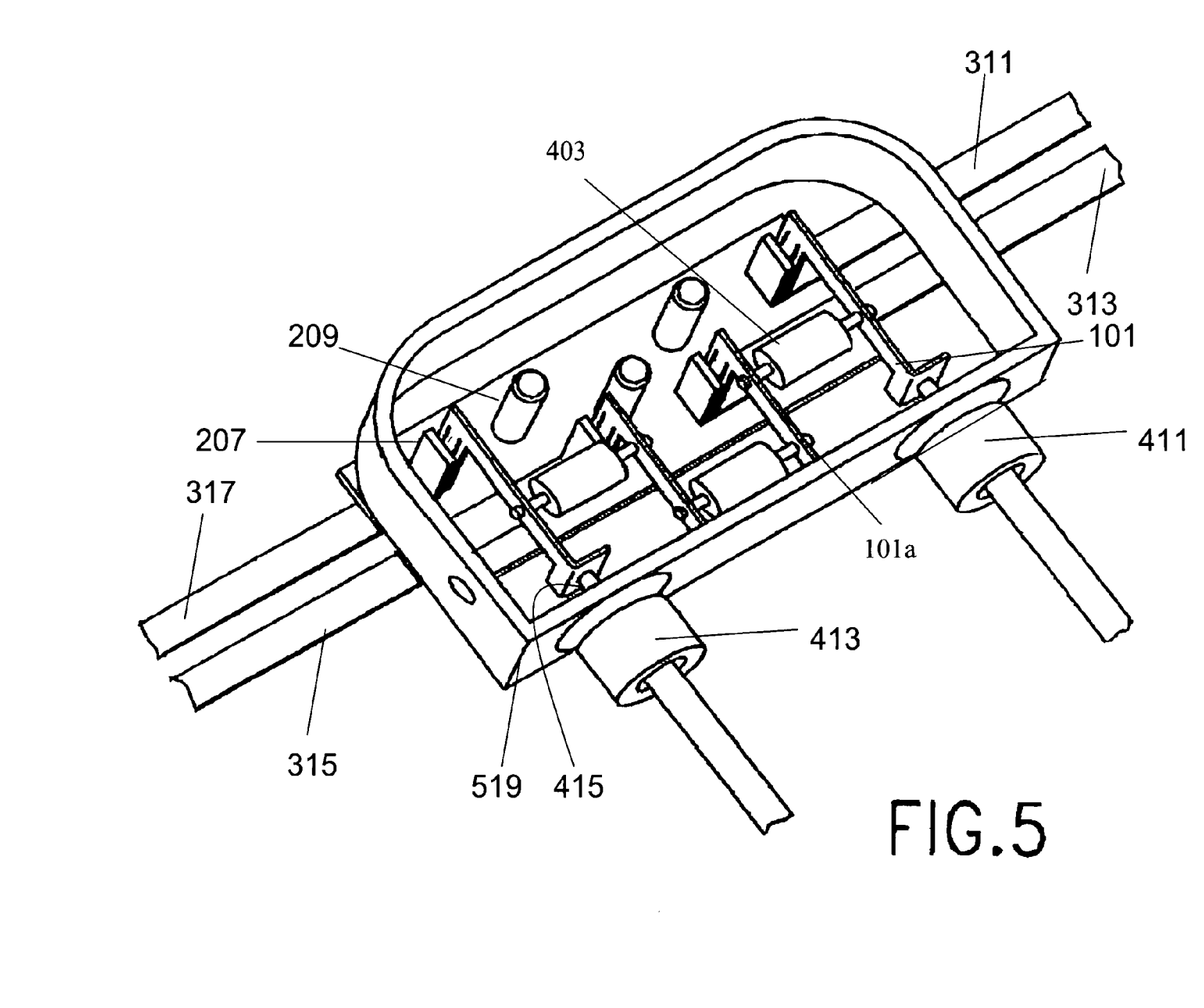
FIG. 5 discloses a plate member and various components of a junction box with external cables connected thereto.
Figure 6:
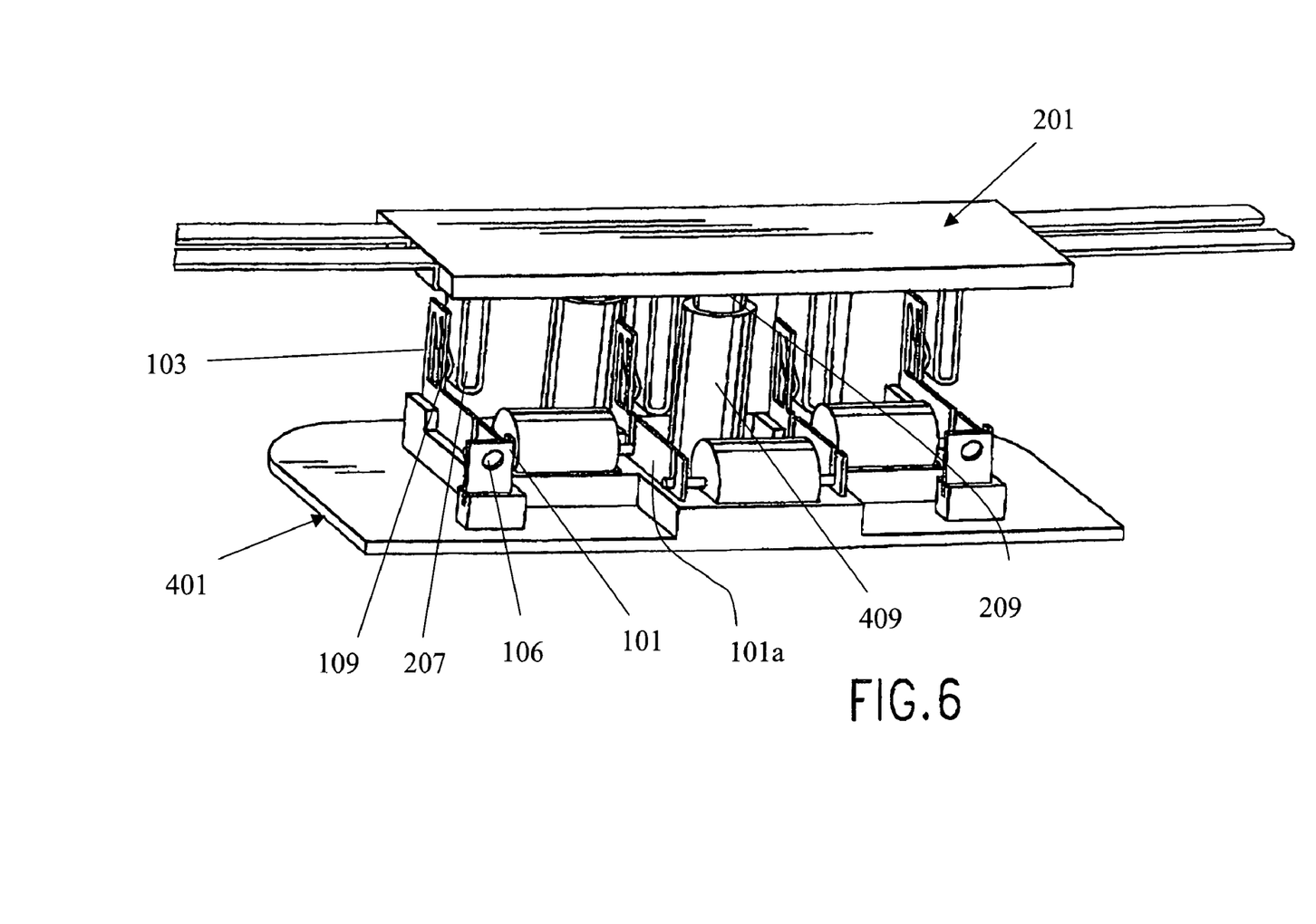
FIG. 6 discloses a plate and base along with the solar ribbon and various components of a junction box.

Additional L-shaped multifunctional connecting elements having conductive members 101a can be seen in FIGS. 4, 5 and 6 which are similar in construction to the conductive members 101 of the connecting elements shown in FIG. 1, except they do not include a second angular section. Moreover, the conductive members 101a each include two component retaining slots 105 within their flat section 102 in contrast to the conductive member 101 of connecting elements shown in FIG. 1.

As depicted in FIG. 1, the angular section 103 and the flat section 102 form an L-shape and the angular section 104 and the flat section 102 form a second L-shape. Moreover, the angular sections 103 and 104 extend in different directions which are orthogonal to a longitudinal axis of the flat section 102, respectively.

Figure 2:
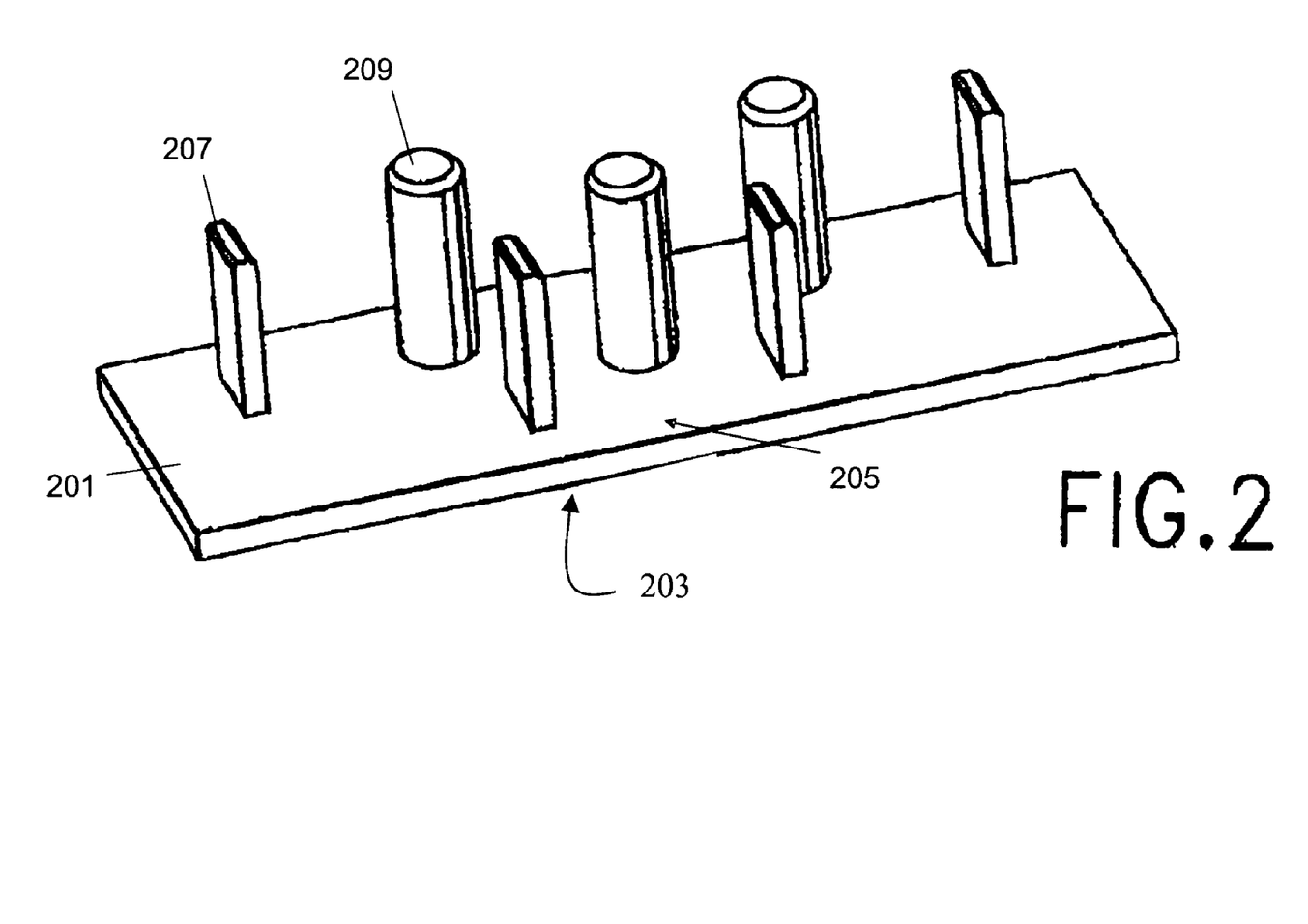
FIG. 2 discloses a plate member of a junction box.

FIG. 2 discloses a plate member 201 having a first surface 203 and a second surface 205. The plate member 201 further comprises a first protruding section 207 vertically extending from the second surface 205. The first protruding section 207 may form a rectangular extension having a flat rectangular shape and may extend perpendicularly with respect to the second surface 205 within an orthogonally range between e.g. 85° and 95°. Preferably, the first protruding section extends orthogonally at 90° with respect to the second surface 205. By way of example, the plate member 201 may comprise a plurality of first protruding sections 207 as depicted in FIG. 2, each first protruding section being, e.g., associated with a respective solar ribbon (FIG. 3) of a plurality of solar cells connected through this photovoltaic junction box.

Furthermore, the plate member 201 may comprise a second protruding section 209 forming, e.g., a cylindrical extension for properly positioning the plate with respect to a base. In particular, the second protruding section 209 is formed such that it can be received within or by a third protruding section formed on the base, e.g., by a third protruding section like a hollowed cylindrical receptacle (409, FIG. 4) in order to position the plate against the base. By way of example, the plate member 201 may comprise a plurality of second protruding sections 209 for positioning the plate member 201 with respect to the base. Alternatively, the cylindrical extension 209 as depicted in FIG. 2 may be formed by a hollowed cylindrical section like, e.g., a hull.

Figure 3:
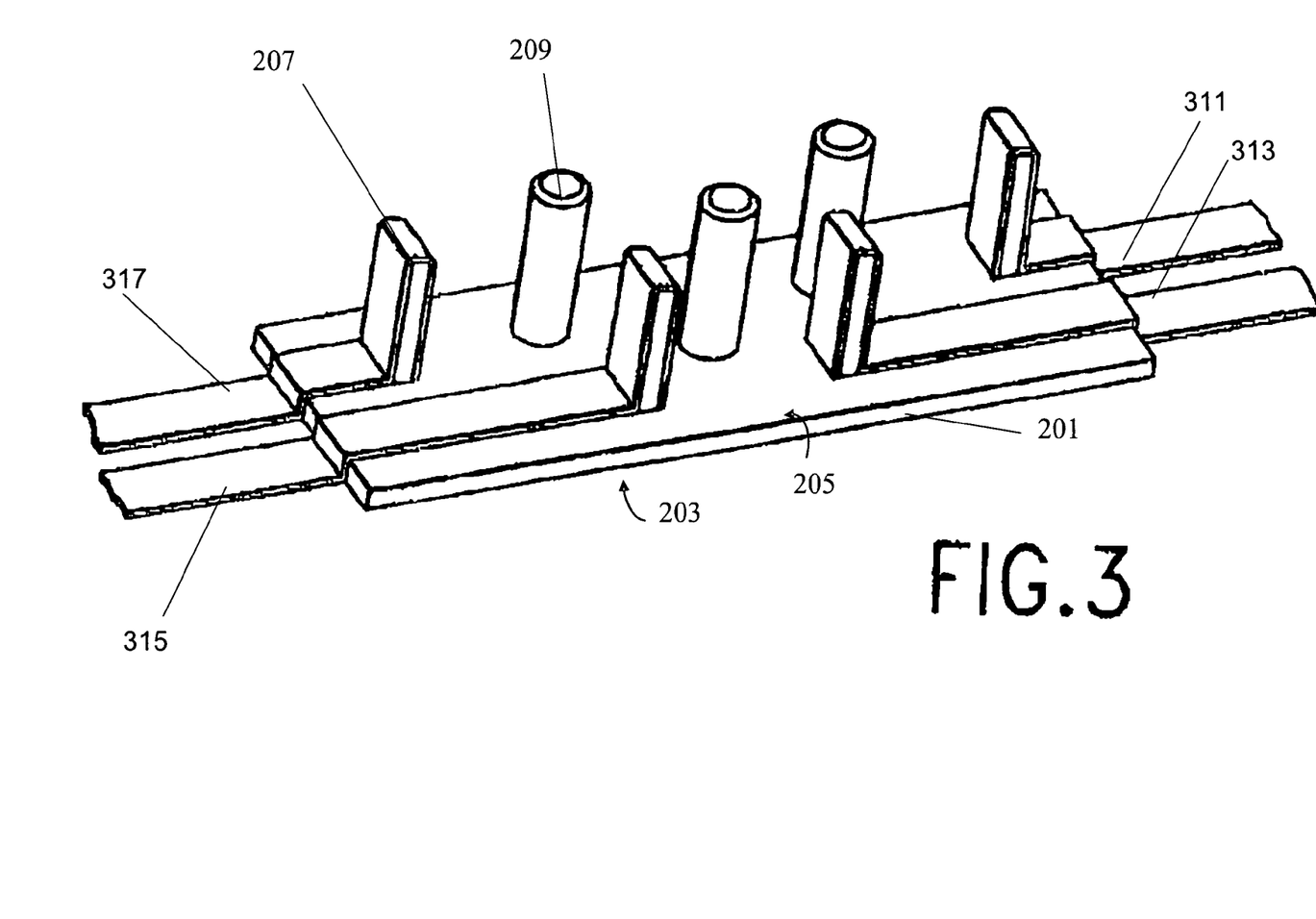
FIG. 3 discloses the plate member of FIG. 2 and solar ribbon adhered thereto.

FIG. 3 discloses a plate member similar to that shown in FIG. 2 but with solar ribbons 311, 313, 315 and 317 adhered thereto. Furthermore, the plate member comprises first protruding sections 207. The first protruding sections 207, as depicted in FIG. 2 and FIG. 3, have a rectangular form, but may alternately be formed, for example, in a wedge-shaped form, which tapers to a narrower top (free end) than bottom.

Figure 8:
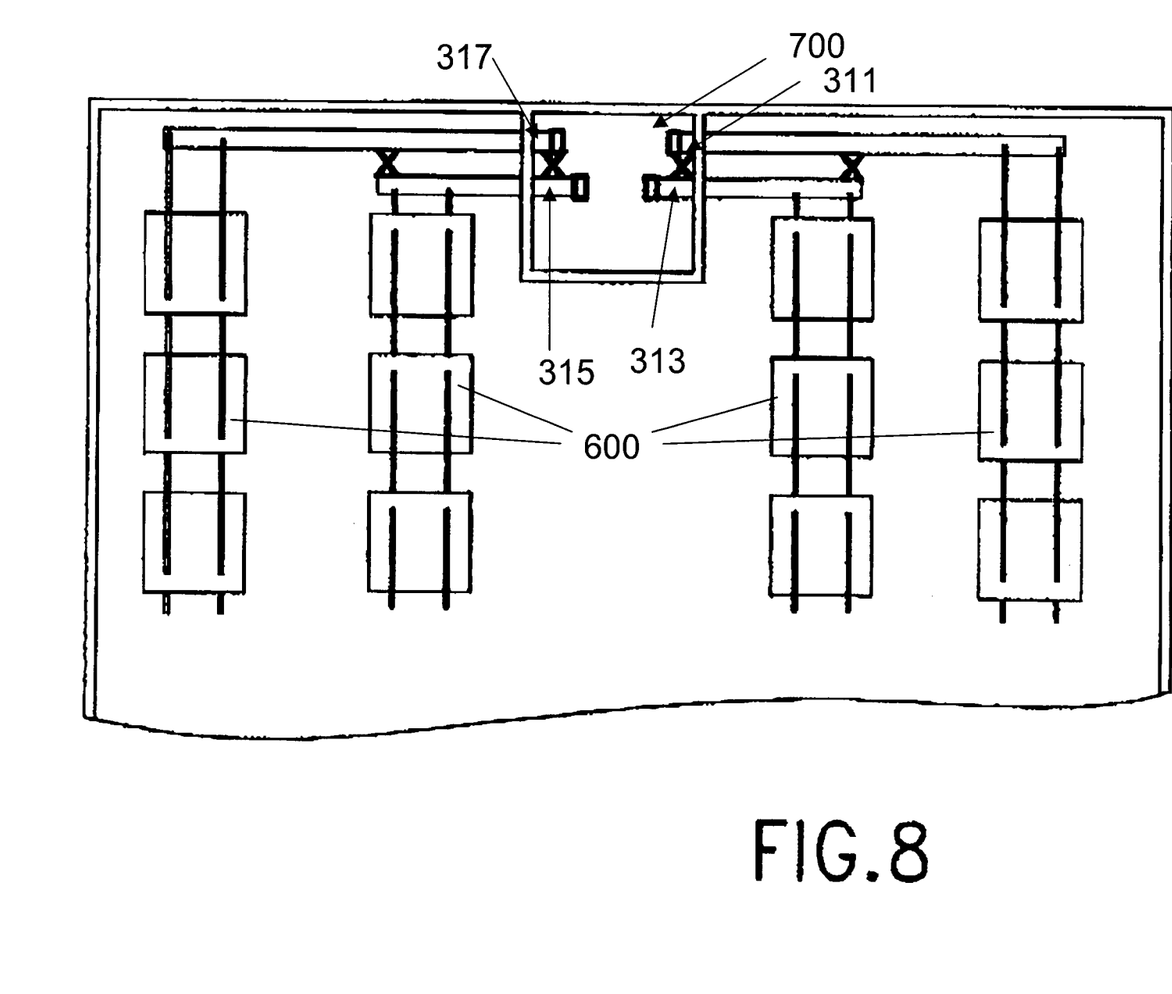
FIG. 8 discloses arrangement of a solar cell panel together with a junction box connected to the solar cells.

The plate member further comprises a first solar ribbon 311, a second solar ribbon 313, a third solar ribbon 315 and a fourth solar ribbon 317. The solar ribbons 311 to 317 are arranged to form contact terminals for extending from the solar panels having, for example, a serial connection of several solar cells 600, as depicted in FIG. 8 schematically showing an arrangement of a solar cell panel together with a junction box 700 connected to the solar cells 600. More specifically, each solar ribbon covers at least a portion of a respective first protruding section 207 and extends on the second surface 205 of the plate member in the longitudinal direction to a respective solar panel or solar cell in the panel. In particular, each solar ribbon is adhered to at least part of the second surface 205 and the opposing surfaces of the first protruding sections 207 to form contact areas for connection to the resilient connecting member 109 (as shown in FIG. 6). A transparent laminate film may be utilized to retain the solar ribbon to the plate member.

FIG. 4 shows junction box elements comprising a base member 401 for accommodating an electric component, e.g. a diode 403. The junction box elements further comprise a connecting element having a conductive member 101 corresponding to the connecting element as depicted in FIG. 1 and a connecting element having a conductive member 101a. In order to accommodate the connecting element, the base member 401 comprises a channel section 407 for edgewise accommodation of the connecting element as depicted in FIG. 4. Furthermore, the base member 401 further comprises a third protruding section 409 for mating with a second protruding section 209, e.g., a tubular section 409 for receiving a cylindrical section 209 of FIGS. 2 and 3. The base member 401 is depicted in FIG. 7 with the electric components and connecting elements being unpopulated.

Figure 7:
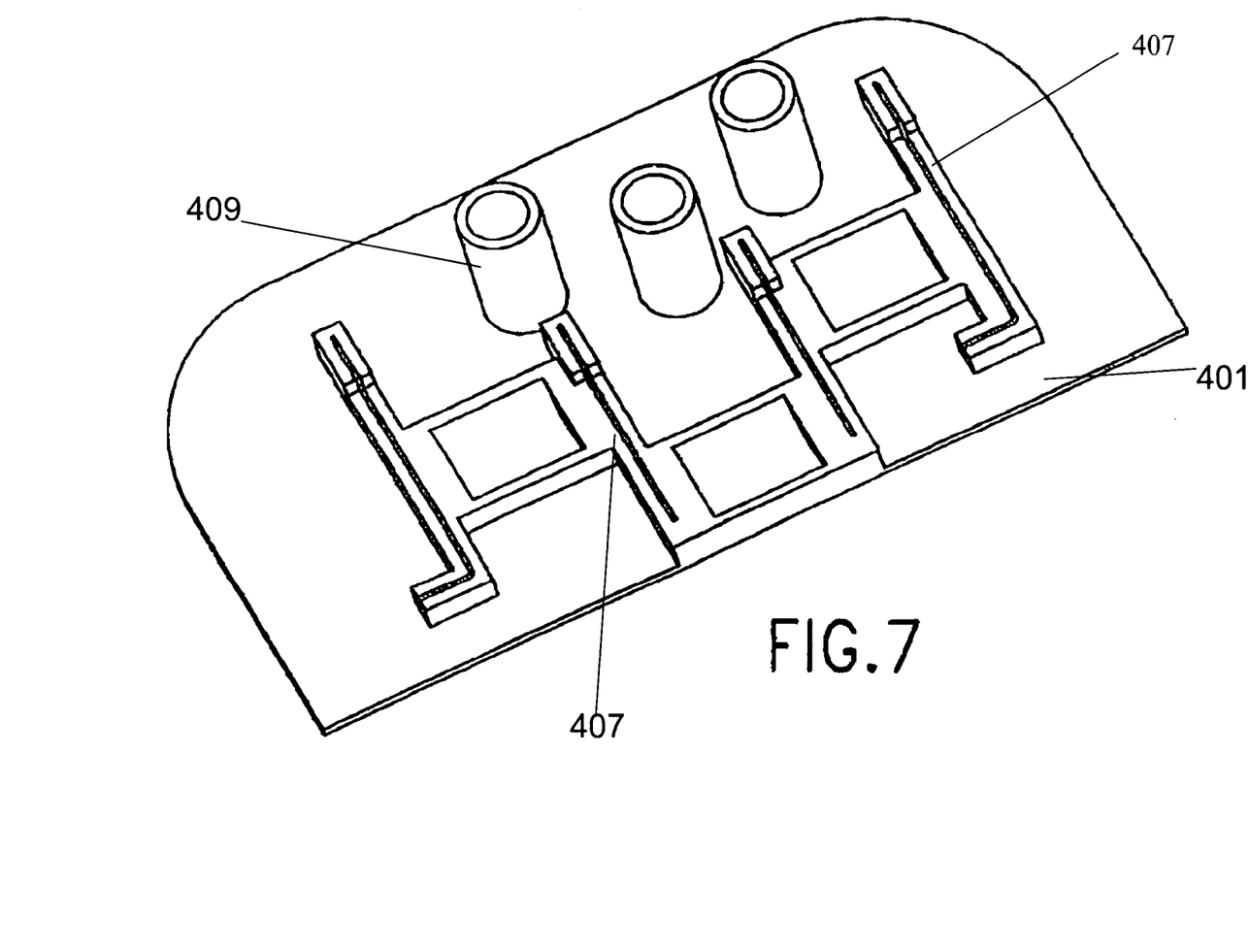
FIG. 7 discloses the base member of FIG. 4 but without the various components of a junction box.

As depicted in FIG. 4 and FIG. 7, the junction box elements may comprise a plurality of channel sections 407 on the base member 401, each for accommodating a respective connecting element in an edgewise orientation. Each connecting element comprises at least one notch at its flat section for receiving a terminal of a respective diode 403 so that a respective diode 403 is arranged between two neighbouring connecting elements, wherein the connecting terminals of a respective diode 403 are accommodated in respective notches of the connecting elements. The diodes 403 are positioned within compartment areas 405 provided in the base. The compartment areas may be formed as partial cylindrical indentations within the base member designed to conform to and receive the diode body 403. Correspondingly, the base member 401 may comprise a plurality of third protruding sections 409, e.g., the depicted tubular sections 409 being arranged so as to receive the cylindrical sections 209 depicted in FIG. 2.

The two outmost connecting elements have, in correspondence to the embodiment of FIG. 1, conductive members 101 having the second angular sections which include an opening or cut-out section 106, as depicted in FIG. 1 for cable connection to connectors 411 and 413 as more clearly depicted in FIG. 5. Furthermore, the electric components 403 are interconnected by the conductive members 101 and 101a.

FIG. 5 shows elements of a solar panel junction box, in principal seen from an opposite side in comparison to FIG. 4, having a plate member 201 as shown in FIGS. 2 and 3, first protruding sections 207 and second protruding sections 209. Furthermore, solar ribbons 311, 313, 315 and 317 are provided, wherein each solar ribbon 311 to 317 covers at least a part of a second surface of the plate member 201 and the respective opposing surfaces of a respective extending first protruding section 207, in correspondence with the embodiment of FIG. 3.

The solar panel junction box shown here further comprises a plurality of connecting elements, each having a conductive member 101 corresponding to the connecting element of FIG. 1 and a plurality of connecting elements each having a conductive member 101a. Furthermore, a plurality of electric elements 403, e.g. capacitors or diodes, are provided, wherein each electric component 403 is accommodated in corresponding notches of neighbouring connecting elements 101, 101a according to the embodiment of FIG. 4. As shown therein, the two outerconnecting elements 101 include the second angular section 104 as shown in FIG. 1 and have a single notch 105 for retaining a terminal of the outer diodes 403. The two inner connecting elements 101a do not include a second angular section and each include two notches for retaining a respective one of the appropriate terminals of the outer diodes as well as for receiving a respective terminal of the inner diode 403.

The solar panel junction box further comprises a frame member 519 for accommodating, e.g., external cable lines of connectors 411 and 413 having terminals 415 connecting to the second angular sections 104 of the outmost connecting elements 101, e.g., by means of a cut-out 106 according to FIG. 1. It is noted however, that a connection of external cable lines may be provided in accordance with the specific embodiment of cable line connector terminals for example by means of connection to the flat section 102 or, alternatively, by means of other connection to the second angular section 104, too The solar panel junction box elements shown in FIG. 5 may be connected with the base member 401 shown in FIG. 7 being arranged to fit into the frame member 519 so as to capsule the electric elements within the junction box.

FIG. 6 shows a solar panel junction box comprising the junction box elements of FIG. 4 and the plate member of FIG. 2 or of FIG. 3 but without a frame member for reason of clarity. As depicted in FIG. 6, the cylindrical second protruding sections 209 of the plate member are received by the tubular third protruding sections 409 of the base member such that the plate member 201 may be positioned with respect to the base member 401 and the retained connecting elements. As further depicted in FIG. 6, the resilient connecting members 109 of the first angular sections 103 of the connecting elements are resiliently contacting against the protruding sections 207 of the plate member which are covered by the solar ribbon so as to contact to the solar cells arranged on solar panels, as depicted for example in FIG. 8.

The particular combinations of elements and features in the above detailed embodiments are exemplary only; the interchanging and substitution of these teachings with other teachings in this and the patents/applications incorporated by reference are also expressly contemplated. As those skilled in the art will recognize, variations, modifications, various combinations and other implementations of what is described herein can occur to those of ordinary skill in the art without departing from the spirit and the scope of the invention as claimed. Accordingly, the foregoing description is by way of example only and is not intended as limiting. The invention's scope is defined in the following claims and the equivalents thereto.

What is claimed is:

1. A junction box, comprising:
a connecting element comprising a conductive member with a flat section having at least one notch and a first angular section, the first angular section comprising a resilient connecting member forming an electrical contact;
a base member for accommodating said connecting element and an electric component having a connecting terminal;
the notch of the flat section being formed to receive the connecting terminal of the electric component;
a plurality of connecting elements, each having a conductive member with a flat section having at least one notch and a first angular section, the first angular section comprising a resilient connecting member forming an electrical contact;
the base member being adapted to accommodate a plurality of electric components, each having a connecting terminal;
each notch being formed to accommodate a connecting terminal of a respective electric component; and a plate member, comprising:
  a first surface and a second surface, the second surface opposing the first surface; and
  a first protruding section protruding from the second surface for positioning a solar ribbon for connection with said resilient connecting member.

2. The junction box according to claim 1, wherein the base member includes a channel section for edgewise accommodation of the conductive member.

3. The junction box according to claim 1, further comprising the electric component, in particular a capacitor or a diode.

4. The junction box according to claim 1, wherein
  at least some of the conductive members have a second angular section with the flat section being arranged between the first angular section and the second angular section.

5. The junction box according to claim 1, wherein the first protruding section has a generally rectangular shape having two opposed surfaces respectively facing towards a longitudinal axis of the solar ribbon adhered thereto.

6. The junction box according to claim 1 wherein, the first protruding section has a flat rectangular shape.

7. The junction box according to claim 1, further comprising a plurality of first protruding sections protruding from the second surface for contacting to a plurality of solar ribbons and a plurality of second protruding sections which can be mated with a plurality of third protruding sections protruding from a base for positioning the resilient connecting member against the solar ribbon.

8. The junction box according to claim 1 further comprising a second protruding section protruding from the second surface of the solar member.

9. The junction box according to claim 8, wherein the second protruding section comprises a cylindrical or tubular section protruding from the second surface of the solar member.

10. A solar panel junction box, comprising:
  a plate member having a first surface and a second surface, the second surface opposing the first surface, the plate member further comprising a first protruding section protruding from the second surface of the plate member;
  a solar ribbon covering at least a part of a surface of the first protruding section to form a contact surface;
  a connecting element with a conductive member having a flat section and a first angular section, the first angular section comprising a resilient connecting member;
  the resilient connecting member resiliently contacting to the solar ribbon.

11. The solar panel junction box according to claim 10, the second surface extending along a longitudinal axis of the plate member, the first protruding section perpendicularly protruding with respect to the longitudinal axis within an orthogonality range.

12. The solar panel junction box according to claim 10, the first protruding section having a rectangular shape having two opposed surfaces respectively facing towards a longitudinal axis of the solar ribbon.

13. The solar panel junction box according to claim 10, the first protruding section having a flat rectangular shape.

14. The solar panel junction box according to claim 10, the first protruding section having two opposing surfaces which are covered by the solar ribbon, the solar ribbon further extending on the second surface in a longitudinal direction of the plate member to a solar cell.

15. The solar panel junction box according to claim 10, a surface of the first angular section is coplanar with a surface of the flat section with the resilient connecting member extending outward therefrom, the second angular section extending orthogonal to the flat section within an orthogonality range.

16. The solar panel junction box according to claim 10, the first angular section comprising a recess towards which the resilient connecting member is resiliently movable, the resilient connecting member being integrally formed with the first angular section.

17. The solar panel junction box according to claim 10, further comprising
  a base member for accommodating an electric component;
  the notch of the flat section of the connecting element being formed to receive a connecting terminal of an electric component.

18. The solar panel junction box according to claim 10, further comprising
  a base member for accommodating an electric component;
  the notch of the flat section of the connecting element being formed to receive a connecting terminal of the electric component;
  the base member comprising a channel section for edgewise accommodating the connecting element.

19. The solar panel junction box according to claim 10, further comprising an electric component, in particular a capacitor or a diode.

20. The solar panel junction box according to claim 10, further comprising
  a base member, the base member comprising at least one third protruding section;
  the plate member comprising at least one second protruding section protruding from the second surface of the plate member;
  the at least one third protruding section accommodating the at least one second protruding section to assemble the base member to the plate member.

21. The solar panel junction box according to claim 10, the conductive member having a second angular section, the flat section being arranged between the first angular section and the second angular section.

22. The solar panel junction box according to claim 21, the flat section extending in a direction of a first axis, the first angular section extending in a direction of a second axis, the second angular section extending in a direction of a third axis, the first axis, the second axis and the third axis being orthogonal with respect to each other within an orthogonality range.

23. The solar panel junction box according to claim 10, comprising:
  a plurality of connecting elements, each having a conductive member with a flat section and a first angular section, each flat section having at least one notch, the first angular section comprising a resilient connecting member;
  a base member being formed to accommodate a plurality of electric components, each having a connecting terminal;
  each notch being formed to accommodate a connecting terminal of a respective electric component.

24. The solar panel junction box according to claim 23, at least some of the conductive members having a second angular section with the flat section being arranged between the first angular section and the second angular section.

25. A method for manufacturing a solar panel junction box, the method comprising:
  forming a connecting element having a conductive member with a flat section having at least one notch and a first angular section, the first angular section comprising a resilient connecting member forming an electrical contact;

forming a plate member having a first surface and a second surface, the second surface having a plurality of first protruding sections and a plurality of second protruding sections extending therefrom;

adhering a solar ribbon against the plate member with at least a portion hereof covering at least a part of a surface of the first protruding section;

forming a base member with a channel portion for retaining the conductive member in an edgewise orientation and with third protruding sections for respectively mating with the second protruding sections and for accommodating an electric component having a connecting terminal;

arranging a connecting terminal of the electric component in the notch of the flat section of the connecting element with the resilient connecting member in contact with the solar ribbon covering the first protruding section.

26. The method according to claim 25, comprising the step of forming at least some connecting elements with a conductive member having a flat section, a first angular section and a second angular section, the flat section being arranged between the first angular section and the second angular section, the first angular section comprising a resilient connecting member.

27. A method for manufacturing a solar panel junction box, the method comprising:

forming a plate member having a first surface and a second surface, the second surface opposing the first surface, the plate member further comprising a first protruding section protruding from the second surface;

adhering a solar ribbon to the plate member covering at least a part of a surface of the first protruding section;

forming a connecting element with a conductive member having a flat section, a first angular section and a second angular section, the flat section being arranged between the first angular section and the second angular section, the first angular section comprising a resilient connecting member; and resiliently contacting the resilient connecting member to the first protruding section to connect to the solar ribbon.

* * * * *